Aug. 15, 1939 V. HIGBIE 2,169,243
SUPERCHARGER AND COOLER ARRANGEMENT
Filed Jan. 9, 1937 2 Sheets-Sheet 2

INVENTOR.
VINTON HIGBIE
BY
ATTORNEY.

Patented Aug. 15, 1939

2,169,243

UNITED STATES PATENT OFFICE 2,169,243

SUPERCHARGER AND COOLER ARRANGEMENT

Vinton Higbie, Paterson, N. J., assignor to Wright Aeronautical Corporation, a corporation of New York Application January 9, 1937, Serial No. 119,837

5 Claims. (Cl. 60—13)

This invention relates to aircraft power plants, and is particularly concerned with improvements in the arrangement of power plants wherein turbo superchargers and coolers between the supercharger and engine form a part of the unit.

It is known that turbo superchargers have been used in connection with aircraft engines, wherein the turbo supercharger comprises a unitary structure including a turbine wheel driven by exhaust gases from the engine, the turbine wheel in turn driving a centrifugal blower which serves to supercharge air entering the induction system of the engine. With the natural increase in temperature of the compressed charge flowing from the supercharger, cooling becomes desirable to reduce the temperature of the charge and thus to increase the weight of charge which the engine cylinders receive. Certain installations have already been made involving turbo superchargers and coolers, but the physical arrangement of the various units of the assembly has been such that a considerable amount of space is taken up in the power plant system, and in addition, the aerodynamic drag of the system has left much to be desired.

An object of this invention, therefore, is to provide a compact arrangement of a charge cooled turbo supercharged power plant, wherein the several components are close to one another, are arranged to permit of a minimum drag of the power plant, and are arranged for easy access for servicing, assembly, and disassembly.

A further object is to arrange a turbo supercharger unit toward the upper side of a power plant installation, to directly connect a charge cooler of adequate size thereto, and to directly connect the cooler to the engine air intake system.

A further object is to provide means for supplying cooling air to the cooler as part of the anti-drag cowling system of the aircraft.

Still another object is to provide a cooler proper which is compact in size and form, and yet adequate in capacity to properly cool compressed charges flowing therethrough.

A further object is to provide a cooler wherein warm compressed air is fed thereto at spaced apart points on one side of the cooler, and wherein the cooled charges flowing from the cooler issue from a central portion of the device, between the air entrances thereof.

Still another object is to provide a substantially symmetrical and compact duct arrangement for leading exhaust gases to the turbine, and to withdraw compressed air from the supercharger, of a turbo supercharger unit.

Other objects will be apparent from a reading of the subjoined specification and claims, and from an examination of the drawings, in which like numerals indicate similar parts, and in which:

Fig. 4 is a diagrammatic perspective view of the cooler arrangement as compared with a cooler of equivalent capacity but of other shape.

Figure 1:
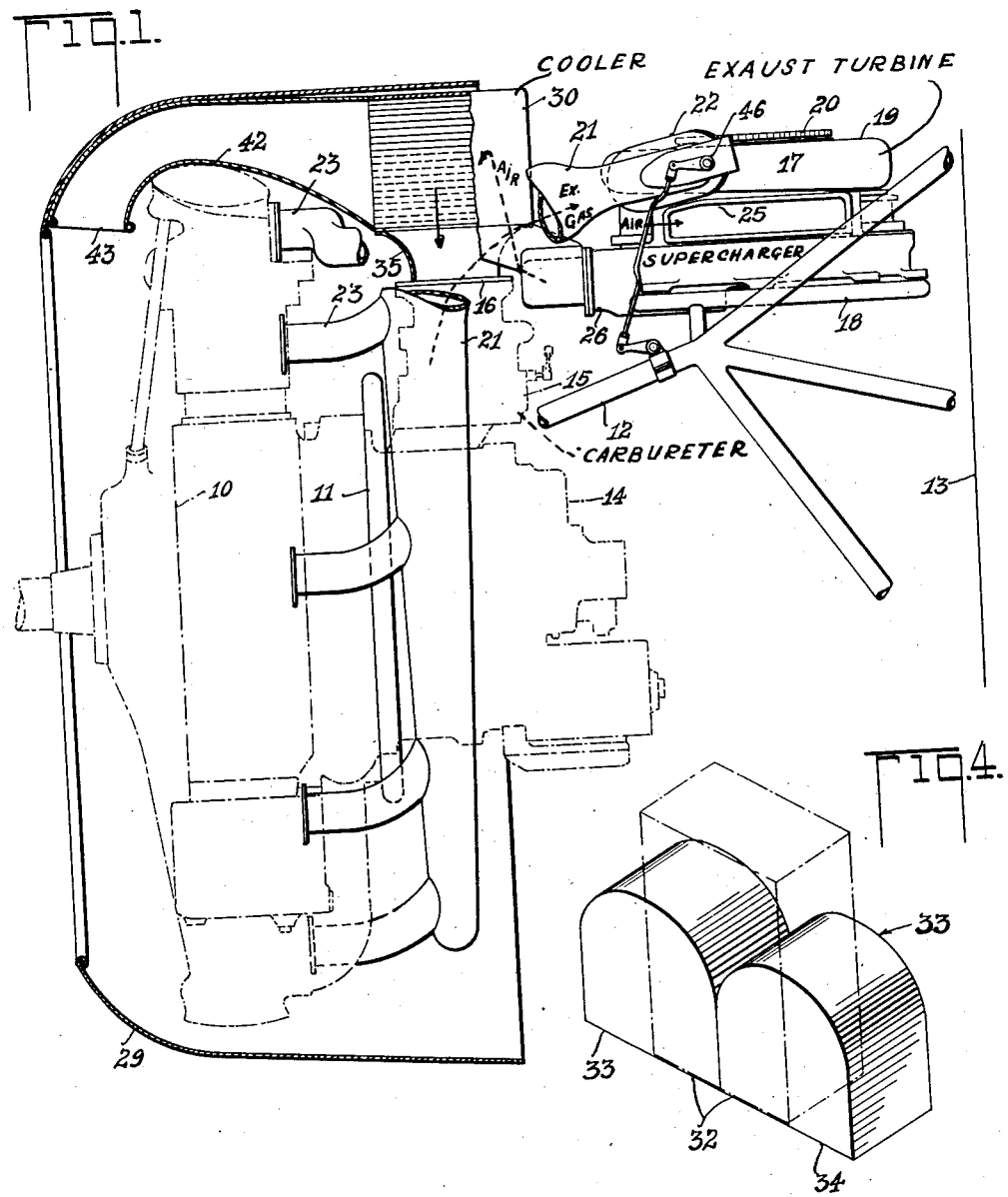
Fig. 1 is a side elevation, partly in section, of the major portion of an aircraft power plant installation.
Figure 2:
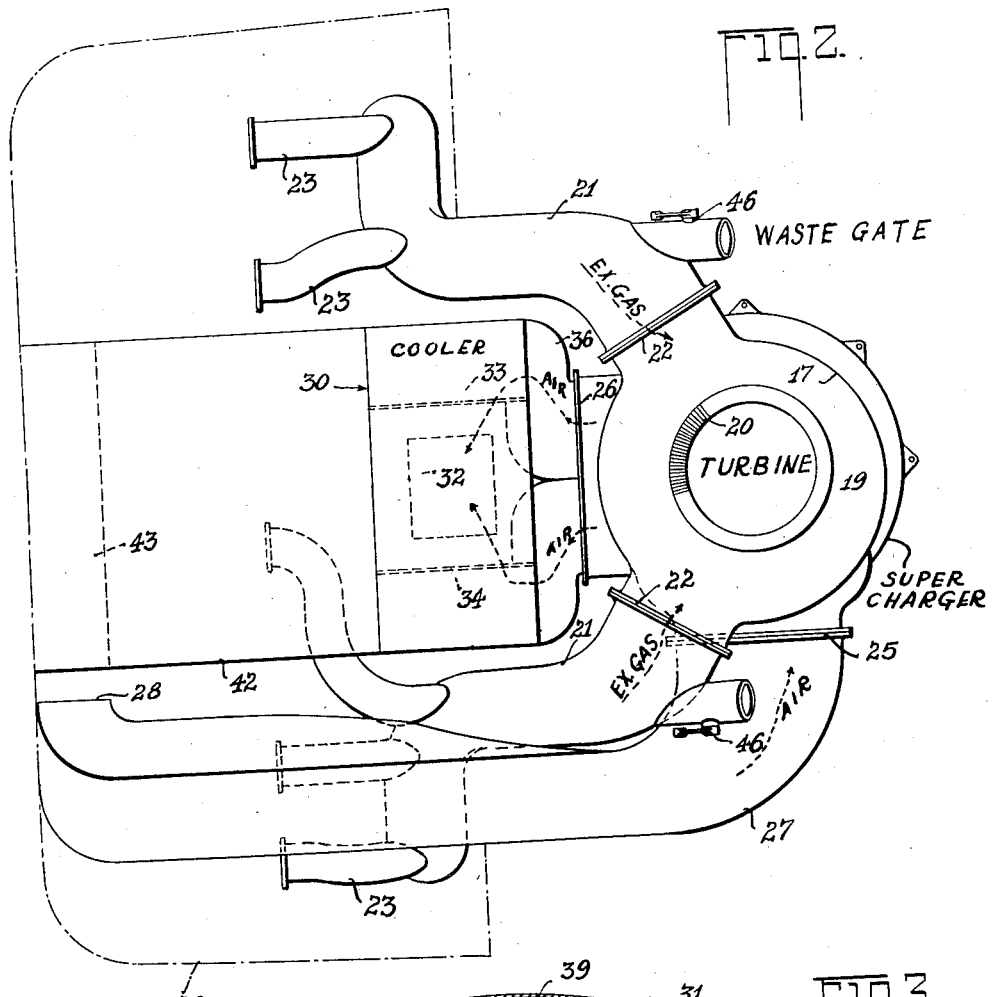
Fig. 2 is a plan of the power plant and turbo supercharger organization, omitting certain non-essential details.

Fig. 1 shows the general organization of the power plant incorporating features of this invention, wherein 10 designates a radial cylinder air-cooled aircraft engine attached in a well-known manner to a mounting ring 11 carried by engine mounting structure 12, which terminates at its rearward end at a fire wall 13. The normal accessory section 14 of the engine lies rearwardly of the mounting ring 11, and upon this section 14 is mounted a down draft carburetor 15, having an air intake flange 16.

A turbo supercharger unit of conventional form, and designated in its entirety as 17, is horizontally mounted upon a ring 18 carried by the engine mounting structure 12. The turbo supercharger 17 comprises an exhaust box 19 having a turbine wheel 20 centrally located in a suitable opening in its upper part. Exhaust gas is fed to the box 19 from manifolds 21 connected to circumferentially spaced flanges 22 on the box 19. The manifolds 21 are of more or less conventional form, each one embracing approximately one-half of the engine 10 and receiving exhaust gas from the several engine cylinders through ducts 23. The lower portion of the unit 17 comprises a centrifugal air compressor having an air intake opening 25 and an air outlet opening 26, the latter facing forwardly and lying approximately at the level of the carburetor air intake 16. The air intake 25, in the present invention, connects with a duct 27 extending forwardly to an air inlet 28 located beneath the leading edge of a ring cowling 29 which is attached to and embraces the engine 10.

A charge cooling unit 30 is mounted upon the carburetor air intake 16 and comprises a plurality of end-expanded tubes nested together to provide within the cooler, spaces between the tubes for the passage of air delivered by the supercharger. The upper and lateral sides of the nest of tubes are embraced by a housing 31, while the lower side of the tube nest is provided with three openings 32, 33 and 34, all of these openings communicating with the inter-tube spaces. The central opening 32 connects directly to the carburetor air intake 16 through a very short duct 35, while the lateral openings 33 and 34, on each side of the opening 32, are connected by a substantially Y-shaped duct unit 36 to the supercharger air outlet 26. It will thus be seen that air leaving the supercharger is divided between the two limbs of the duct 36, entering the cooler at 33 and 34. Within the cooler, baffles 38 are provided in the inter-tube spaces to direct air entering at 33 and 34 toward the upper part of the tube nest, whence the charge turns inwardly to leave the cooler through the opening 32. If desired, a central baffle 39 may be provided within the cooler to augment smoother flow of the compressed charge therethrough.

The particular form of cooler, as above described, is of great utility in providing adequate cooling air for the compressed charge while occupying a relatively small space in the power plant. Referring to Fig. 4, it will be noted that the reverse flow effect obtained by bottom entrance and exit openings for the cooler produces a relatively wide and low unit, as distinguished from a high and narrow unit of equivalent capacity which is indicated by dot and dash lines. The central disposition of the cooler 30 at the top of the engine is in a region where a device of the form herein shown may be readily placed. If the high and narrow cooler were to be placed in an equivalent position, the cooler would project beyond the normal confines of the power plant. In the prior art, charge cooling radiators have at times been disposed at the sides of the aircraft power plant, rather than at the top thereof, which has necessitated unnecessarily long ducts between supercharger and cooler, and between cooler and engine carburetor air intake, which long ducts tend to reduce the pressure increase caused by the supercharger.

Cooling air for the cooler is led through a duct 42 having an air entrance opening 43 beneath the leading edge of the cowling 29, the duct 42 passing over the engine cylinders and leading to the bores of the nested tubes which comprise the cooler 30. Discharge of cooling air from the cooler is in a rearward direction, passing over the turbine wheel 20, whence the combined exhaust gases from the wheel 20 and the warm air leaving the cooler pass rearwardly over the fuselage with a minimum tendency toward increasing drag.

Figure 3:
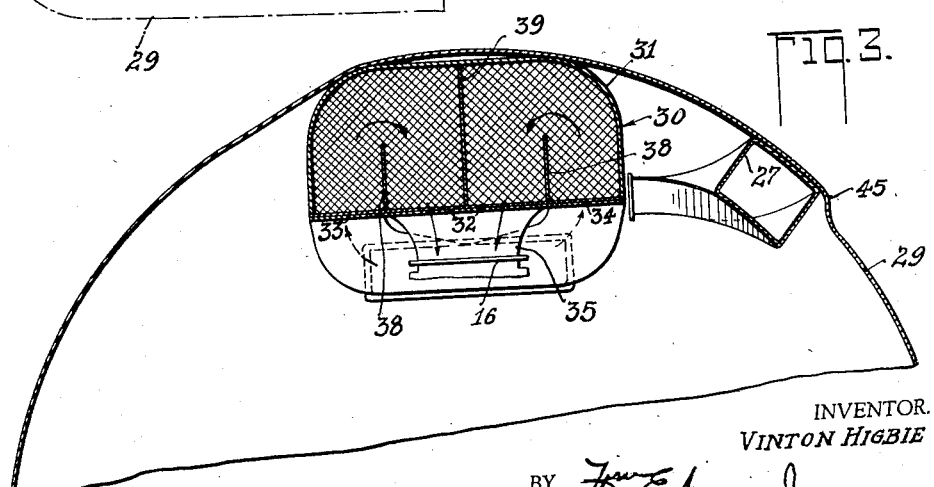
Fig. 3 is a section on a transverse plane through the cooler and part of the cowling.

Fig. 3 indicates the transverse contour of the cowl ring 29, and it will be noted that the upper part thereof is distended as at 45 to accommodate the air duct 27, the air duct 42, and the cooler 30. As to the exhaust manifolds 21, waste gates 46 are provided, by which the exhaust gases may be by-passed prior to entering the turbo box 19 in case the boost in fuel charge is not needed. These waste gates, according to conventional practice, are provided with remote controls to the quarters of the air craft crew.

While I have described my invention in detail in its present preferred embodiment, it will be obvious to those skilled in the art, after understanding my invention, that various changes and modifications may be made therein without departing from the spirit or scope thereof. I aim in the appended claims to cover all such modifications and changes.

I claim as my invention:

1. In an aircraft power plant including an engine, a close-coupled turbo supercharger-cooler arrangement comprising a downwardly discharging cooler discharging directly into the intake duct of said engine, said cooler having spaced downwardly directed intake openings, laterally spaced to embrace the cooler discharge opening, and laterally spaced outlet ducts for the supercharger directly connected to said cooler at said intake openings.

2. An aircraft power plant comprising an elongated substantially annular cowling open at its forward end, a radial cylinder engine within the cowling, a turbo-supercharger rearward of the engine and wholly housed in said cowling the turbine thereof being connected to receive exhaust gas from the engine and to issue said gas outwardly beyond the cowling, a supercharger air intake duct passing between the engine and cowling open at its forward end within the cowling and ahead of the engine, a charge cooling radiator located and connected between the supercharger exit and the engine air intake, and a cooling air duct for said radiator passing therefrom, forwardly between the engine and cowling and open at its forward end within said cowling and ahead of the engine.

3. An aircraft power plant comprising a radial cylinder engine, an annular cowling, open at its forward end, embracing said engine, a pair of ducts having open forward ends adjacent the cowl opening and extending rearwardly between the engine and cowling, a turbo-supercharger disposed rearward of the engine, within said cowling, with the supercharger intake of which one of said ducts is connected, a radiator, rearward of the engine and within said cowling, with which the other said duct is connected, and conduits respectively connecting the supercharger air exit with the radiator, and the radiator with the air intake of said engine.

4. In an aircraft power plant, an engine having a charge intake opening rearwardly thereof and facing upwardly, a charge cooler secured thereto having an outlet opening registering with said charge intake opening, said cooler including portions laterally disposed relative to the outlet opening having cooler inlet openings therein, a supercharger closely adjacent the rear of said cooler, a branched outlet adapter connecting the supercharger and cooler, receiving the supercharger delivery and directing same to the cooler inlet openings, and an engine exhaust driven turbine directly driving said supercharger having its exhaust outlet at the top of the turbine.

5. In an aircraft power plant, an engine having a charge intake opening rearwardly thereof and facing upwardly, a charge cooler secured thereto having an outlet opening registering with said charge intake opening, said cooler including portions laterally disposed relative to the outlet opening having cooler inlet openings therein, a supercharger closely adjacent the rear of said cooler, a branched outlet adapter connecting the supercharger and cooler, receiving the supercharger delivery and directing same to the cooler inlet openings, an engine exhaust driven turbine directly driving said supercharger having its exhaust outlet at the top of the turbine, and branched exhaust pipes from the engine passing on opposite sides of said cooler and feeding at laterally spaced apart points to the turbine.

VINTON HIGBIE.